(12) United States Patent
Ishii et al.

(10) Patent No.: US 8,556,353 B2
(45) Date of Patent: Oct. 15, 2013

(54) BRAKE DEVICE

(75) Inventors: Hideaki Ishii, Minami-Alps (JP); Kazumoto Sano, Chuo (JP); Kunihiro Matsunaga, Minami-Alps (JP); Masaru Sakuma, Kai (JP)

(73) Assignee: Hitachi, Ltd., Tokyo (JP)

( * ) Notice: Subject to any disclaimer, the term of this patent is extended or adjusted under 35 U.S.C. 154(b) by 897 days.

(21) Appl. No.: 12/379,595

(22) Filed: Feb. 25, 2009

(65) Prior Publication Data

US 2009/0256417 A1   Oct. 15, 2009

(30) Foreign Application Priority Data

Feb. 29, 2008   (JP) .................................. 2008-51307

(51) Int. Cl.
*B60T 8/62* (2006.01)
(52) U.S. Cl.
USPC .......................................... 303/186; 303/152
(58) Field of Classification Search
USPC ............... 303/186, 9.62, 10, 11, 15, 152, 155
See application file for complete search history.

(56) References Cited

U.S. PATENT DOCUMENTS

| 5,173,860 A | 12/1992 | Walenty et al. |
| 6,250,436 B1 | 6/2001 | Oikawa et al. |
| 7,059,691 B2 | 6/2006 | Tsunehara et al. |
| 7,290,840 B2 | 11/2007 | Tsunehara et al. |
| 8,123,310 B2 | 2/2012 | Haupt et al. |
| 2006/0170280 A1* | 8/2006 | Nakayama et al. .......... 303/9.62 |

FOREIGN PATENT DOCUMENTS

| CN | 2411174 Y | 12/2000 |
| JP | 7-81543 | 3/1995 |
| JP | 7-165054 | 6/1995 |
| JP | 2000-283198 | 10/2000 |
| JP | 2002-187453 | 7/2002 |
| JP | 2004-322810 | 11/2004 |
| JP | 2005-349944 | 12/2005 |
| JP | 2007-500104 | 1/2007 |

OTHER PUBLICATIONS

Japanese Office Action (with English translation) issued May 9, 2012 in corresponding Japanese Patent Application No. 2008-051307.

* cited by examiner

*Primary Examiner* — Melanie Torres Williams
(74) *Attorney, Agent, or Firm* — Wenderoth, Lind & Ponack, LLP (57) ABSTRACT

In response to depression of a brake pedal (6), an electric brake (5) mounted on the rear side starts to generate a braking force at the time of stroke h1 before a fluid pressure brake (4) mounted on the front side starts to generate a braking force when the stroke reaches stroke h2. Accordingly, the rear side is able to generate a braking force prior to the front side, whereby it is possible to reduce a rigid feeling, and therefore improve the pedal feeling.

20 Claims, 7 Drawing Sheets

§ BRAKE DEVICE

BACKGROUND OF THE INVENTION

The present invention relates to a brake device for use in braking of a vehicle.

Japanese Patent Public Disclosure No. Hei 7-165054 discloses a brake device in which a braking force is generated by using hydraulic power on the left and right front wheels (front side) and electric power on the left and right rear wheels (rear side).

However, in the brake device disclosed in Japanese Patent Public Disclosure No. Hei 7-165054, the braking force on the rear side is set according to the fluid pressure on the front side, whereby braking can be controlled only by the response of the hydraulic system. For this reason, when a large pad clearance is set on the front side for preventing the dragging phenomenon, an invalid operation amount immediately after braking operation start is unavoidably increased accordingly, whereby responsiveness is deteriorated and brake feeling cannot be improved.

SUMMARY OF THE INVENTION

The present invention has been contrived in consideration of the above-mentioned circumstances, and an object thereof is to provide a brake device in which brake feeling can be improved.

An aspect of the present invention is a brake device comprising:

a front braking mechanism operable to generate a braking force by pressing of a brake pad against a rotating disk rotor with use of a fluid pressure generated in a master cylinder in response to an operation of a braking operator; and a rear braking mechanism operable to generate a braking force with use of another power source than the fluid pressure generated in the master cylinder in response to the operation of the braking operator, wherein the rear braking mechanism generates the braking force before the front braking mechanism generates the braking force when the braking operator is operated.

BRIEF DESCRIPTION OF THE DRAWINGS

FIG. 4(a) illustrates the pedal stroke-braking force characteristics, and FIG. 4(b) is a table illustrating a braking force output situation in zones A-D shown in FIG. 4(a);

DETAILED DESCRIPTION OF THE INVENTION

Hereinafter, an embodiment of the present invention will be described with reference to FIG. 1 to 4.

Figure 1:
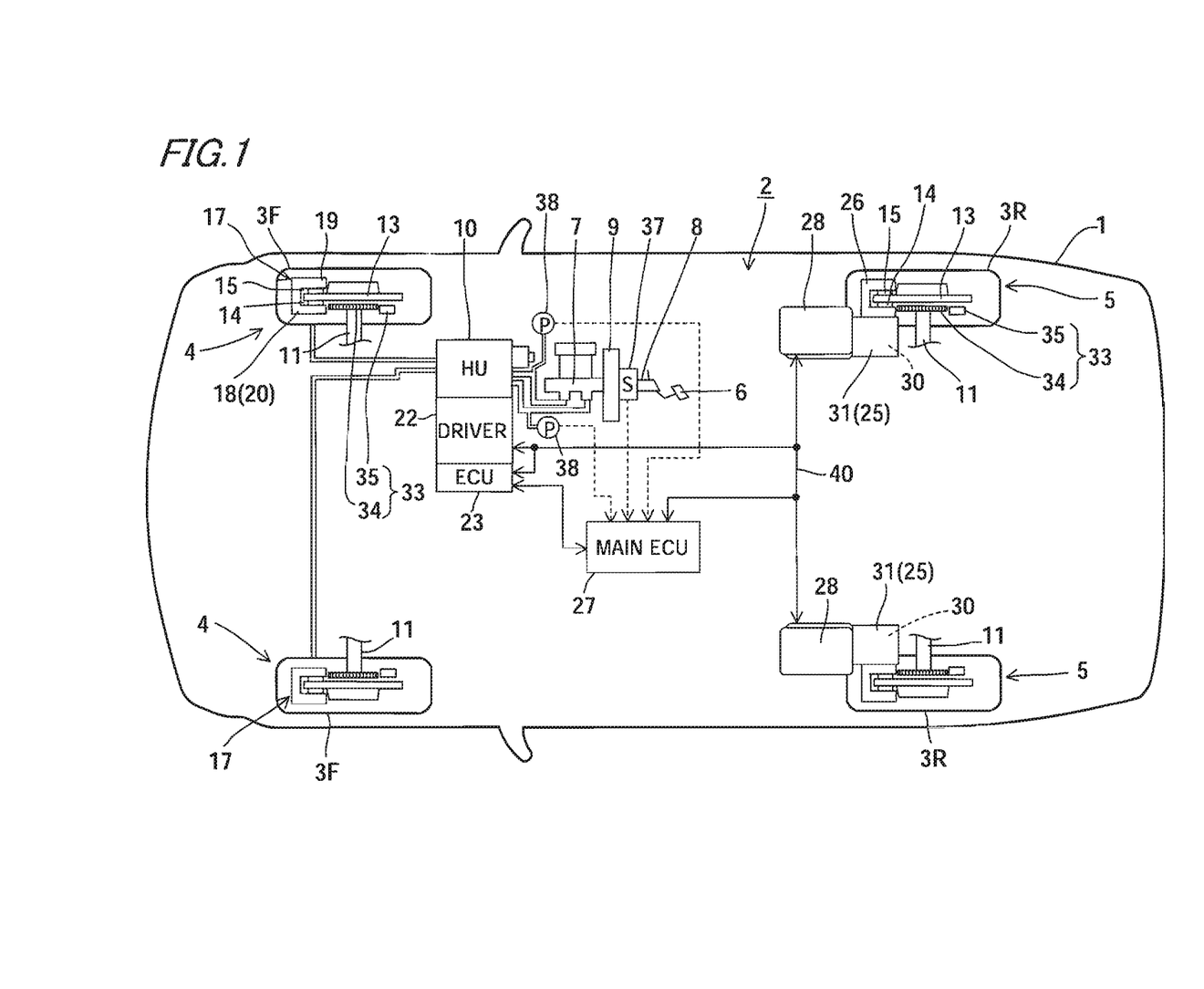
FIG. 1 is a plane view schematically illustrating a brake device according to a first embodiment of the present invention together with a vehicle provided with the brake device.
Figure 2:
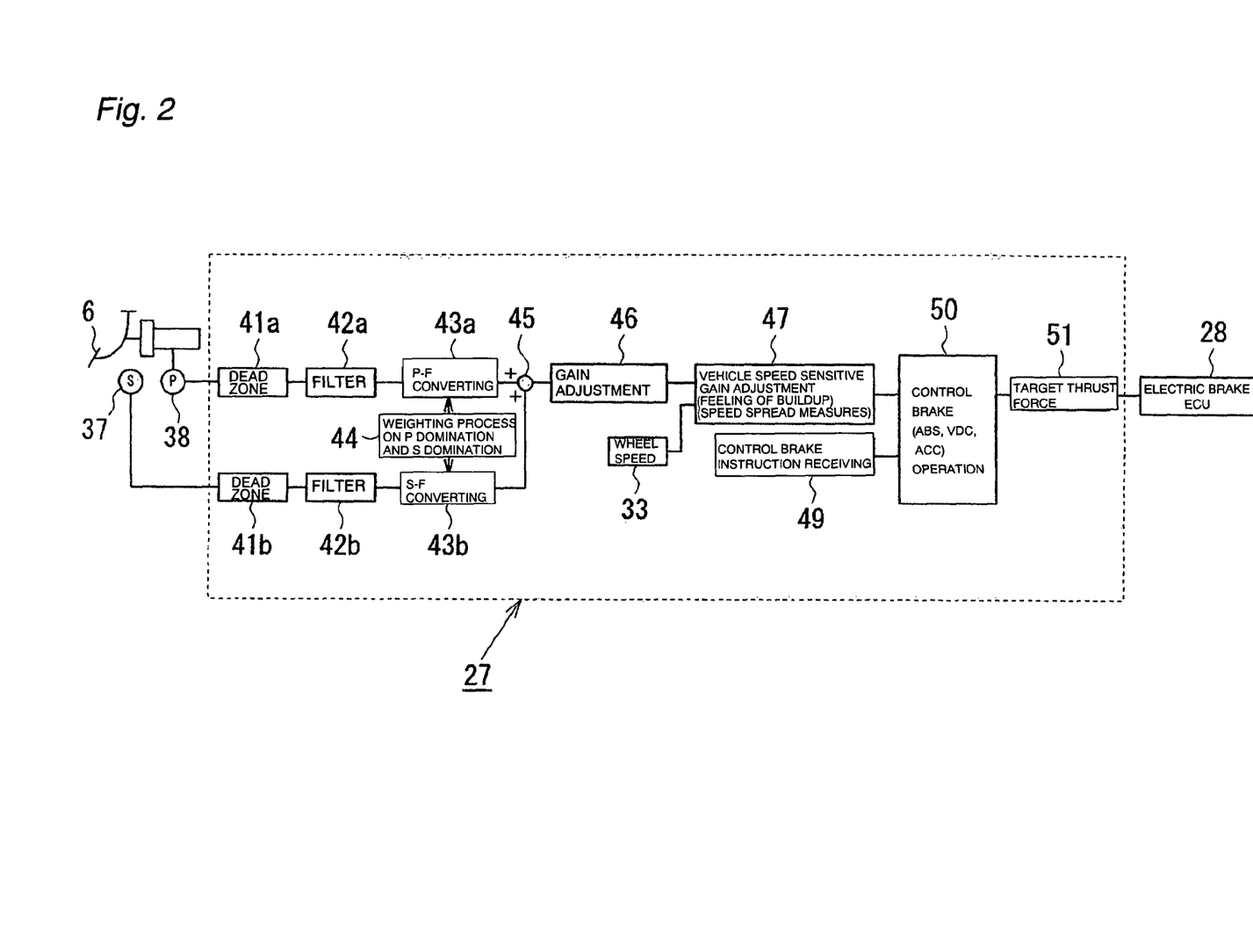
FIG. 2 is a control block diagram schematically illustrating a calculation and process performed by a main ECU shown in FIG. 1.
Figure 3:
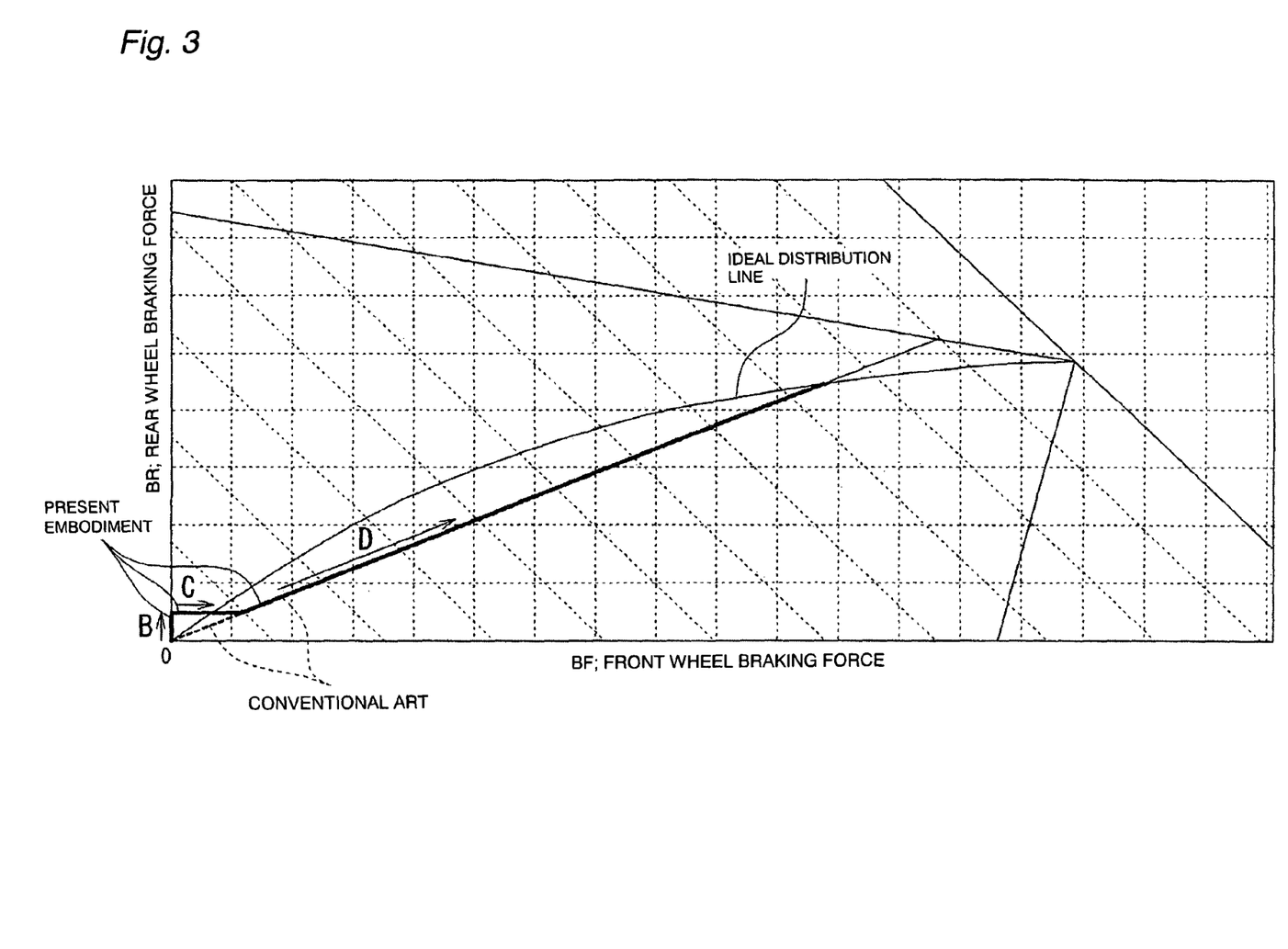
FIG. 3 illustrates the comparison between the braking force distribution between a front wheel and a rear wheel in the device shown in FIG. 1, and that in a conventional brake device.
Figure 4:
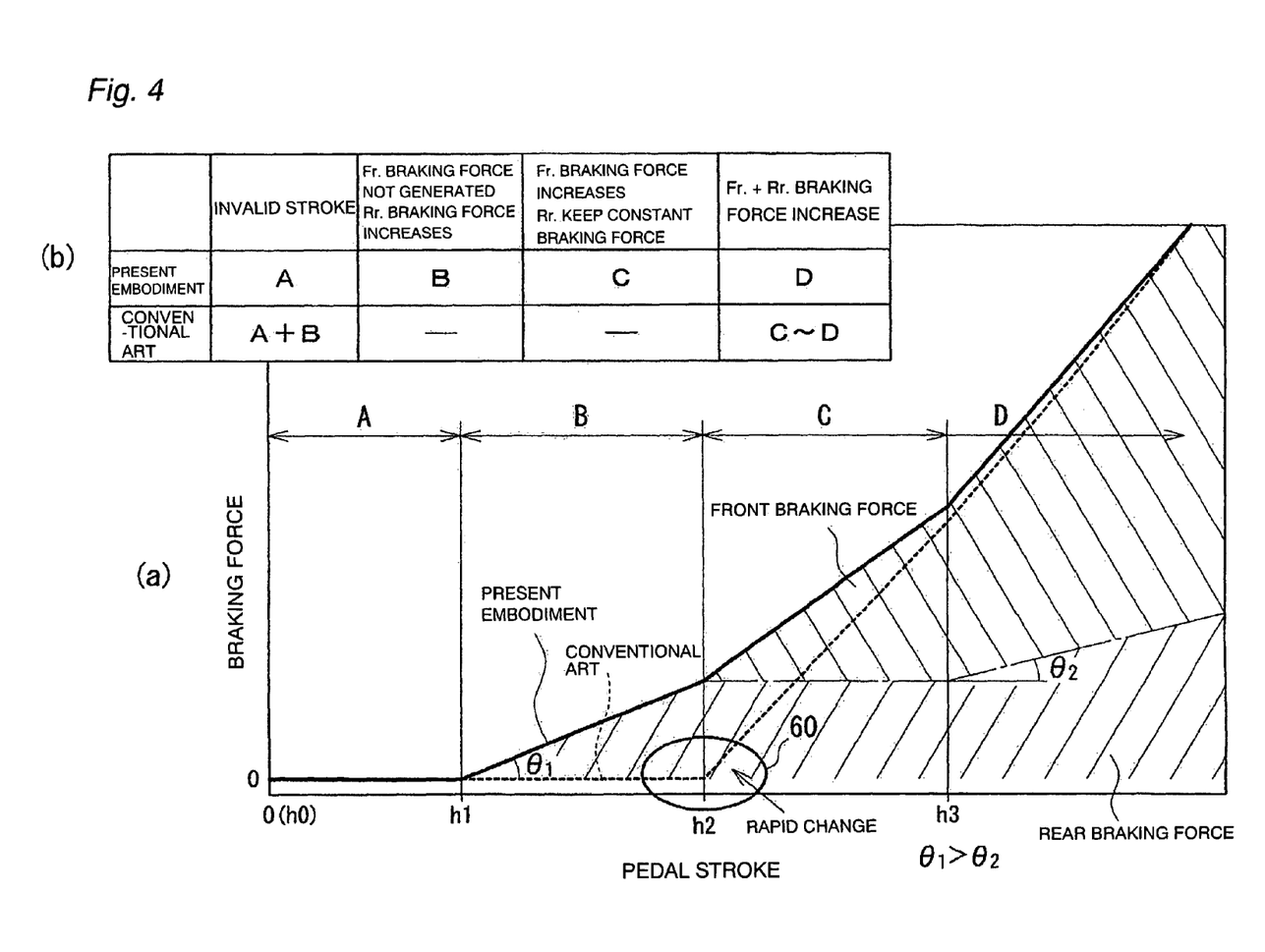
FIG. 4 illustrates the relationship between the pedal stroke and the braking force in the left bottom area (an area with small braking force) shown in FIG. 3, for each of the brake device shown in FIG. 1 and the conventional brake device, and specifically.

FIG. 1 is a plane view schematically illustrating a brake device according to a first embodiment of the present invention together with a vehicle provided with the brake device. FIG. 2 is a control block diagram schematically illustrating a calculation and process performed by a main ECU shown in FIG. 1. FIG. 3 illustrates the comparison between the braking force distribution between a front wheel and a rear wheel in the device shown in FIG. 1, and that in a conventional brake device. FIG. 4 illustrates the relationship between the pedal stroke and the braking force in the left bottom area (an area with small braking force) shown in FIG. 3, for each of the brake device shown in FIG. 1 and the conventional brake device. Specifically, FIG. 4(a) illustrates the pedal stroke-braking force characteristics, and FIG. 4(b) is a table illustrating a braking force output situation in zones A-D shown in FIG. 4(a).

Referring to FIG. 1, a brake device 2 mounted on an automobile (vehicle) 1 comprises fluid pressure brakes 4 (front braking mechanisms) disposed for left and right front wheels 3F and 3F [i.e., disposed on the front (Fr.) side], and electric brakes 5 (rear braking mechanisms) disposed for left and right rear wheels 3R and 3R (i.e., disposed on the rear (Rr.) side), and a master cylinder 7 adapted to generate an oil pressure (fluid pressure) by being actuated in response to a depression (operation) of a brake pedal 6 (braking operator). An input rod 8 and a booster 9 are disposed between the brake pedal 6 and the master cylinder 7, and a pressing force (operation force) acting on the brake pedal 6 is boosted and transmitted to the master cylinder 7. In the present embodiment, a braking operator is embodied by the brake pedal 6 by way of example. Instead of it, a braking operator may be embodied by another user interface such as a brake lever used in a two-wheel vehicle and the like, a push button switch, or a joystick.

A fluid pressure unit (hereinafter referred to as "HU" (Hydraulic Unit)) 10 is disposed between the master cylinder 7 and the fluid pressure brake 4. The fluid pressure unit 10 contains a not-shown Vehicles Attitude Control pump and the like, and can perform the Vehicles Attitude Control function. A fluid pressure generated in the master cylinder 7 is supplied to the fluid pressure brake 4 through the HU 10 so that a braking force is exerted on the front wheel 3F.

The fluid pressure brake 4 comprises a pair of brake pads 14 and 15 disposed on the respective sides of a disk rotor 13 attached to a wheel shaft 11 (refer to FIG. 5), and a fluid pressure caliper 17 operable to push the pair of disk pads 14 and 15 to the respective sides of the disk rotor 13 so as to generate a braking force. Hereinafter, "brake pad 14" and "brake pad 15" are also referred to as "inner pad 14" and "outer pad 15", respectively, when such names are more appropriate. The fluid pressure caliper 17 generally comprises a cylinder portion 18 facing the inner pad 14, and a claw portion 19 extending from the cylinder portion 18 to the opposite side of the disk rotor 13 over the disk rotor 13. Return springs (not shown) are disposed at the pair of brake pads 14 and 15 for urging the brake pads 14 and 15 away from the disk rotor 13, respectively. Due to the provision of the return springs (not-shown), a pad clearances is generated between the disk rotor 13 and the brake pads 14, 15.

The fluid pressure brake 4 generates a braking force when the brake pedal 6 is pressed down [a stroke when the brake pedal 6 starts to be pressed down is referred to as "stroke h0"; the "stroke h0" is also referred to "stroke 0" sometimes.], the brake pedal 6 continues a downward movement, a fluid pressure is started to be generated in the master cylinder 7, and the stroke value reaches, for example, stroke h2 as shown on the broken line in FIG. 4. In this way, in the fluid pressure brake 4, a braking force is not generated immediately when the brake pedal 6 is pressed down, and braking force generation occurs after the brake pedal 6 is pressed down, for example, beyond a zone A (stroke h0-h1) and a zone B (stroke h1-h2) shown in FIG. 4. That is, in the fluid pressure brake 4, a stroke in the zones A and B shown in FIG. 4 is invalid. As in the fluid pressure brake 4, a stroke in the zones A and B is also invalid in the above-mentioned conventional electric caliper.

In the cylinder portion 18, a bottomed cylinder 20 is formed. The cylinder 20 has an opening on the inner pad 14 side, and a bottom wall (cylinder bottom wall) [not labeled] on the other end. A piston (not shown) is slidably inserted through a piston seal [not labeled] in the cylinder 20. A not-shown fluid pressure chamber is defined between the piston and the cylinder bottom wall (not labeled). The master cylinder 7 is connected to the fluid pressure chamber via the fluid pressure unit 10. A fluid pressure is supplied from the master cylinder 7 to the fluid pressure chamber after the Vehicles Attitude Control function is performed on the fluid pressure in the fluid pressure unit 10.

The fluid pressure unit 10 is integrally formed with a driver (hereinafter referred to as "HU driver") 22 for actuating the not-shown Vehicles Attitude Control mechanism (Vehicles Attitude Control function performing unit) including the Vehicles Attitude Control pump, and an ECU (hereinafter referred to as fluid pressure unit ECU) 23 for controlling the HU driver 22.

Main differences between the fluid pressure brake 4 mounted on the front side, and the electric brake 5 mounted on the rear side are that the electric brake 5 has the following features (i) to (iv).

(i) The electric brake 5 comprises an electric caliper 26 [hereinafter also referred to as "EFC" (Electric Fist-type Caliper) including an electric motor 25, instead of the fluid pressure caliper 17. While the fluid pressure brake 4 generates a braking force by utilizing an oil pressure (fluid pressure) generated in the master cylinder 7 (by sandwiching the disk rotor 13 between the brake pads 14 and 15), the electric brake 5 generates a braking force by utilizing power from the electric motor 25.

(ii) The electric brake 5 comprises a motor driver 31 for actuating the electric motor 25 upon receiving an instruction signal (target thrust force) from a main ECU 27 (which will be described later).

(iii) The electric brake 5 comprises an ECU (hereafter referred to as "electric brake ECU") 28 for controlling a not-shown stroke sensor (hereinafter referred to as "motor stroke sensor") 30 operable to detect a stroke position of the electric motor 25.

(iv) In the electric caliper 26 of the electric brake 5, the clearance between the disk rotor 13 and the brake pads 14, 15 (hereinafter referred to as "pad clearance") can be set to any value. Usually, the pad clearance is set according to a vehicle running condition based on an instruction from the main ECU 27. In the present embodiment, in a normal running condition, the pad clearance set in the electric caliper 26 on the rear side is smaller than the pad clearance set in the fluid pressure caliper 17 of the fluid pressure brake 4 on the front side. In other words, the pad clearance set in the caliper 17 of the fluid pressure brake 4 is set so as to be larger than the pad clearance set in the caliper 26 of the electric brake 5.

Wheel speed sensors 33 are disposed in the vicinity of the left and right front wheels 3F, 3F and the left and right rear wheels 3R, 3R, respectively. The wheel speed sensor 33 functions with the wheel. The wheel speed sensor 33 generally comprises a reflecting disk 34 at which grooves are formed on the outer circumference thereof so that the grooves are evenly spaced apart, and a detection unit 35 operable to detect a wheel speed by receiving and sending light from and to the reflecting disk.

A stroke sensor [hereinafter referred to as "pedal stroke sensor" for clear description] 37 [operation detector] is disposed for detecting a depression amount of the brake pedal 6 from a displacement of the input rod 8. Fluid pressure sensors 38 are disposed at the pipe (not labeled) connecting the master cylinder 7 and the fluid pressure unit 10 for detecting a fluid pressure supplied to the fluid pressure brake 4 of the left front wheel 3F and the fluid pressure brake 4 of the right front wheel 3F, respectively. The pedal stroke sensor 37 is located on a former stage relative to the fluid pressure brake 4 and the booster 9 due to a force transmission route. The pedal stroke sensor 37 starts to function by depression of the brake pedal 6 and inputs to the main ECU a detection signal indicating that depression of the brake pedal 6 is performed (hereinafter also referred to as "pedal depression signal"), before the fluid pressure brake 4 generates a braking force.

The fluid pressure sensors 38 and the pedal stroke sensor 37 are connected to the main ECU 27, which receives inputs of signals from the sensors (the fluid pressure sensors 38 and the pedal stroke sensor 37), perform calculation according to a predetermined control program, and generates an instruction signal (target thrust force signal) to the electric brake 5.

The main ECU 27, the fluid pressure unit ECU 23 (HU driver 22) and the electric brake ECUs 28, 28 of the left and right rear wheels 3R, 3R are connected through a CAN (Controller Area Network) 40, and signals are exchanged therebetween.

As shown in FIG. 2, the main ECU 27 comprises a fluid-pressure dead zone processing unit 41a, a stroke-value dead zone processing unit 41b, a fluid-pressure filter unit 42a, a stroke-value filter unit 42b, a fluid pressure p-braking force F converting unit (hereinafter refereed to as "P-F converting unit") 43a, a stroke S-braking force F converting unit (hereinafter referred to as "S-F converting unit") 43b, a weighting adjustment unit 44, an addition unit 45, a gain adjustment unit 46, a vehicle speed sensitive gain adjustment unit 47, a control brake instruction receiving unit 49, a control brake actuating unit 50, and a target thrust force signal output unit 51. The term "control brake" herein refers to control functions such as ABS (Antilock Brake System), Vehicles Attitude Control, and ACC (Adaptive Cruise Control).

The fluid-pressure dead zone processing unit 41a compares a value of a detection signal of the fluid pressure sensor 38 to a predetermined dead zone. If the value of the detection signal is included in the dead zone, then the value is set to zero. If the value of the detection signal is not included in the dead zone, then the value itself is input into the P-F converting unit 43a as a signal P through the fluid-pressure filter unit 42a.

The stroke-value dead zone processing unit 41b compares a value of a detection signal of the pedal stroke sensor 37 to a predetermined dead zone. If the value of the detection signal is included in the dead zone, then the value is set to zero. If the value of the detection signal is not included in the dead zone, then the value itself is input into the S-F converting unit 43*b* as a signal S through the stroke-value filter unit 42*b*.

P-F converting unit 43*a* converts the input signal P into a signal indicating a braking force F (braking force signal). S-F converting unit 43*b* converts the input signal S into a signal indicating the braking force F (braking force signal). After that, the weighting adjustment unit 44 performs weighting processes such as multiplication by a predetermined constant value on the signals (braking force signals) obtained by conversion by the P-F converting unit 43*a* and the S-F converting unit 43*b*, and the outputs are respectively input into the addition unit 45.

The addition unit 45 adds the braking force signals input from the respective P-F converting unit 43*a* and the S-F converting unit 43*b*, and inputs the added data into the vehicle speed sensitive gain adjustment unit 47 through the gain adjustment unit 46.

The vehicle speed sensitive gain adjustment unit 47 checks a detection signal of the wheel speed sensor 33, and performs a gain adjustment process on the signal input through the gain adjustment unit 46 to obtain a vehicle speed sensitive gain signal, which is then input into the control brake actuating unit 50. The control brake actuation unit 50 generates a control brake actuation signal based on the vehicle speed sensitive gain signal by checking a signal from the control brake instruction receiving unit 49, and inputs the generated control brake actuation signal into the target thrust force signal output unit 51.

The target thrust force signal output unit 51 calculates a target thrust force signal for generating a target thrust force from the input control brake actuation signal, and outputs the target thrust force signal to the electric brake ECUs 28 associated to the left and right rear wheels 3R, 3R.

In this way, the main ECU 27 receives inputs of signals from the various sensors (the pedal stroke sensor 37 and the fluid pressure sensor 38), and the target thrust force signal output unit 51 outputs a target thrust force signal as an output instruction signal based on the inputs.

The function of the present embodiment configured as mentioned above will be described with reference to FIGS. 3 and 4. When the brake pedal 6 is pressed down for braking, the pedal stroke sensor 37 detects the pressing amount at that time, and the detection signal is input into the main ECU 27 and then the main ECU 27 outputs an output instruction signal. When the electric brake ECU 28 of the electric brake 5 receives the output instruction signal from the main ECU 27, the electric motor 25 starts to operate, and reduces the pad clearance during stroke h1 shown in FIG. 4. Then, the electric brake 5 starts to generate a braking force when the proceeding stroke reaches the stroke h1. At this time, a braking force generation by the electronic brake 5 delays for a certain time period from the time of depression of the brake pedal 6 [corresponding to "stroke 0 (h0)" in FIG. 4], i.e., there is a time lag from depression of the brake pedal 6 to generation of a braking force by the electronic brake 5 (this time lag is referred to as "operation delay time after brake pedal depression". Referring to the graph (a) shown in FIG. 4, the vertical axis represents the braking force. The broken line represents the braking force exerted on all of the four wheels in response to the stroke of the brake pedal 6 in the conventional art, and the solid line represents that in the present embodiment.

In FIG. 4, the operation delay time after brake pedal depression is equivalent to the time corresponding to zone A [stroke h0-h1 in FIG. 4]. Zone A corresponding to the operation delay time represents an invalid stroke of the electric brake 5 in the present embodiment.

However, compared to the time ["A+B" (stroke h0-h2) in FIG. 4] from depression of the brake pedal [stroke 0 (h0) in FIG. 4] to exertion of a braking force [stroke h2 in FIG. 4] in a conventional fluid pressure disk brake, the invalid stroke [zone A] in the present embodiment is shorter. A conventional brake device has a long invalid stroke in this way, for example, because there are generated an invalid stroke during diminishing of a pad clearance of a disk brake receiving a fluid pressure from a master cylinder, invalid stroke in which a fluid pressure is not generated in the fluid pressure chamber until the reservoir and the fluid pressure chamber are disconnected after the inner piston moves by a predetermined distance at the beginning of operation of the master cylinder, and fluid pressure loss due to expansion of the pipe from the master cylinder to the fluid pressure caliper.

In the present embodiment, upon depression of the brake pedal 6, the electric brake 5 on the rear side starts to generate a braking force at the timing corresponding to stroke h1 before the front side (fluid pressure brake 4) starts to generate a braking force (corresponding to stroke h2 in FIG. 4). In zone B, out of the electric brake 5 and the fluid pressure brake 4, only the electric brake 5 on the rear side generates a braking force.

When the brake pedal 6 is operated [depression start at the stroke position h0 in FIG. 4], the main ECU 27 (target thrust force signal output unit 51) detects that the brake pedal 6 is operated, by receiving an input of a pedal depression signal from the pedal stroke sensor 37, and then outputs a target thrust force signal for the left and right rear wheels 3R, 3R to the electric brake ECU 28, so that the electric brake 5 (on the rear side) is actuated, and starts to generate a braking force at an increasing rate θ1 [braking force generation by the electric pedal 5 is started at the stroke position h1 in FIG. 4].

In this way, as shown in FIGS. 3 and 4, the rear side starts to generate a braking force prior to generation of a braking force by the front side, whereby the invalid stroke is reduced. Therefore, responsiveness of braking can be improved, and the increasing rate of a braking force becomes gradual according to an increase in a stroke so that brake feeling can be improved.

That is, in the conventional art, since the braking force on the rear side is set based on the fluid pressure of the front side, the brake control can be performed only by the response of the fluid pressure, whereby it is impossible to improve brake feeling. Especially, the driver may feel a sense of discomfort and have a strange feeling when he/she tries to subtly adjust a slight braking force, for example, during starting braking or finishing braking (the time immediately before releasing the pedal), due to a discontinuous increase in braking force when the stroke is passing the boundary between an invalid stroke zone, in which a fluid pressure is hardly increased during a stroke from a forward movement of the piston caused by an operation of the pedal until sandwiching the disk rotor 13 between the pads, and a valid stroke zone, in which the disk rotor 13 starts to be sandwiched between the pads and the braking force starts to increase as the fluid pressure increases, and after that, a braking force is generated according to the pedal stroke, i.e., when the braking force increasing ratio becomes discontinuous even when the driver's pedal stroke is continuous (refer to a portion indicated by reference numeral 60 with regard to the characteristics of the conventional art indicated by the broken line shown in FIG. 4) (rigid impression is given to the driver).

On the other hand, in the present embodiment, since the rear side can generate a braking force before the front side can generate a braking force, whereby it is possible to reduce rigid feeling relative to a pedal stroke, and gradually increase a braking force according to a proceeding stroke. As a result, pedal feeling can be improved.

In addition, without deteriorating responsiveness, it is possible to increase a set pad clearance of the front caliper. Moreover, even if two (left and right wheels) front fluid pressure systems are failed at the same time, braking can be exerted with use of the rear brakes. Furthermore, since, in the present embodiment, the invalid stroke is zone A (h0-h1) as mentioned above, and is shorter than the invalid stroke [zone A+zone B] in the conventional art, excellent pedal feeling can be secured, as will be mentioned later on.

Once the pedal stroke value reaches the zone [zones beyond stroke h2 in FIG. 4] beyond the invalid stroke zones [zone A+zone B] of the fluid pressure brake 4, the electronic brake 5 (rear braking mechanism) continues to generate a braking force of a constant value (increasing rate 0) in zone c after the fluid pressure brake 4 on the front side starts to generate a braking force (stroke h2 in FIG. 4), maintaining the braking force at stroke h2 in FIG. 4. At this time, the main ECU 27 operates so that the target thrust force signal output from the target thrust force signal output unit 51 becomes constant, in response to start of generation of a braking force by the fluid pressure brake 4 (at the same time of the braking force generation or prior to the braking force generation), by performing a weighting process on the fluid pressure (P) and stroke (S) domination by the weighting adjustment unit 44, and adjusting the gain by the gain adjusting unit 46. Therefore, the electric brake 5 generates a braking force having a constant strength (increasing rate 0) [FIG. 4, zone C], after the front side (fluid pressure brake 4) starts to generate a braking force (after pedal stroke h2 in the example shown in FIG. 4). In this zone, while the electric brake 5 generates a constant braking force, the braking force generated by the fluid pressure brake 4 on the front side is gradually increasing as the pedal stroke advances. Therefore, the total braking force exerted on all of the four wheels by the fluid pressure brake 4 and the electric brake 5 has a larger increasing rate in zone C than that in zone B, as shown in zones B and C in FIG. 4.

The pedal stroke further advances, and in zone D following zone C, the braking forces of both of the fluid pressure brake 4 and the electric brake 5 are gradually increasing as the pedal stroke advances, and the increasing rate of the braking force on the all four wheels in zone D is higher than that in zone C. However, it should be noted that the increasing rate θ2 that is the increasing rate of the braking force of the electric brake 5 on the rear side in this zone D is lower than the increasing rate θ1 of the braking force in zone B.

On the other hand, the braking force generated by the fluid pressure brake 4 on the front side increases as the stroke advances after entering zone C. In this way, addition of the braking force exerted on the four wheels by the fluid pressure brake 4 and the electric brake 5 is gradually increasing once the stroke enters zone C, so as to become similar as much as possible to the ideal distribution line shown in FIG. 3.

In the present embodiment, the pad clearance set to the caliper of the fluid pressure brake 4 is larger than the pad clearance set to the caliper of the electric brake 5. (In other words, the pad clearance set to the electric caliper 26 of the electric brake 5 is smaller than the pad clearance set to the fluid pressure caliper 17 of the fluid pressure brake 4). For this arrangement, it is possible to reduce possibility of occurrence of, so-called dragging phenomenon, i.e., undesirable contact of the disk rotor 13 and the brake pads 14, 15 on the front side during non-braking condition. In addition, it is possible to make an arrangement such that the pad clearance set to the caliper of the electric brake 5 is set to a minimum value immediately after the pedal stroke value enters the invalid stroke zone (zone A in FIG. 4). In this case, it becomes possible to improve responsiveness of the braking force on the rear side.

In the present embodiment, the electric brake 5 generates a braking force having a predetermined value in zone C after the front side (fluid pressure brake 4) starts to generate a braking force (FIG. 4, pedal stroke h2). Instead of this, the braking force control may be performed in the following manner; that is, after start of generation of a braking force by the front side (fluid pressure brake 4) [FIG. 4, pedal stroke h2], the electric brake 5 may generate a braking force according to an operation of the braking operator (brake pedal 6) at an increasing rate [FIG. 4, zone C] lower than that in the previous zone [increasing rate in zone B in the example shown in FIG. 4]. In other words, the increasing rate at which the electric brake 5 generates a braking force after start of generation of the braking force by the front side (fluid pressure brake 4) (zone C) may be lower than the increasing rate at which the electric brake 5 generates a braking force in zone B.

Figure 5:
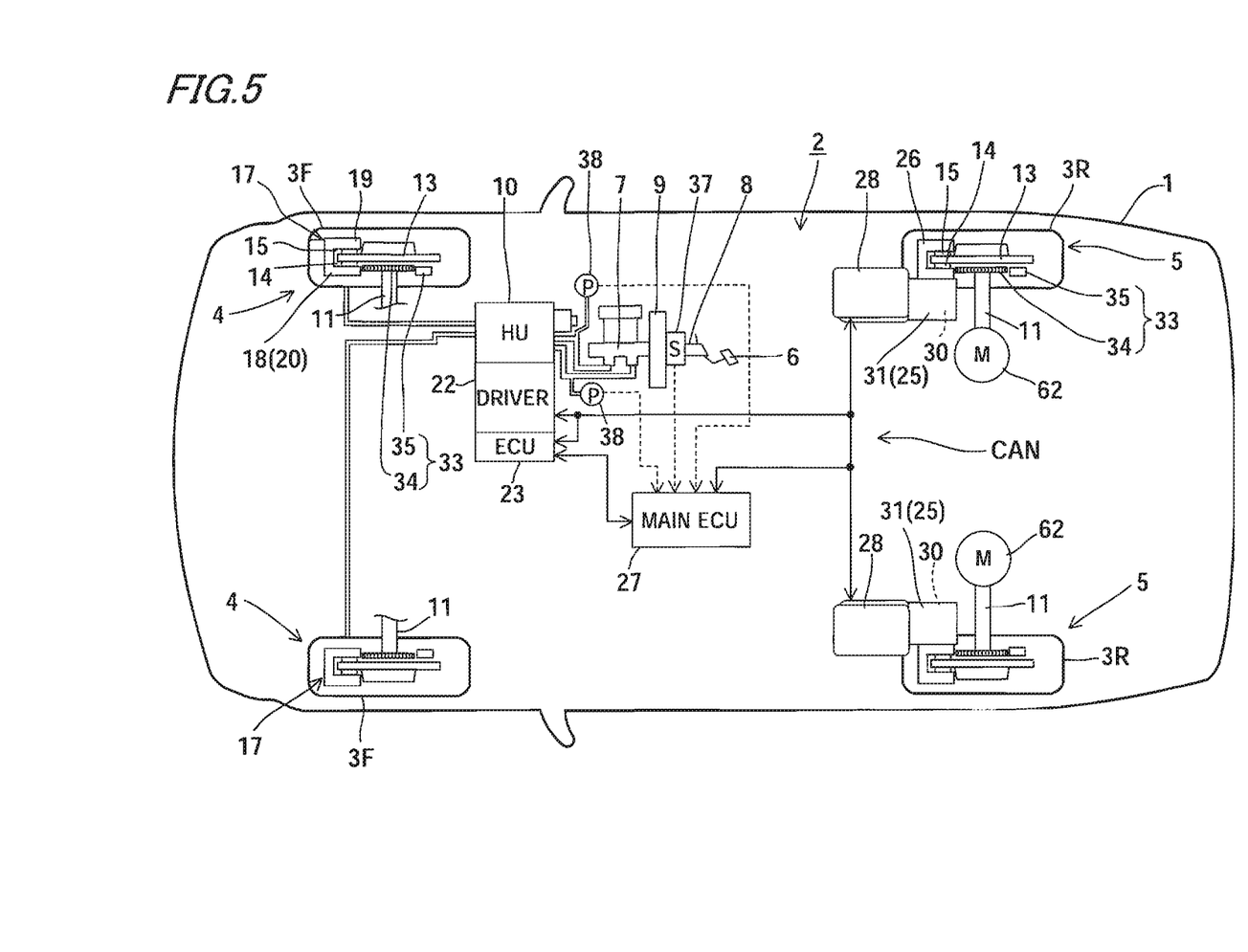
FIG. 5 is a plane view schematically illustrating a brake device using a regenerative mechanism of an electric motor as a rear braking mechanism, together with a vehicle provided with the brake device.

In the present embodiment, a rear braking mechanism is embodied by a braking mechanism using power of the electric motor 25, and generating a braking force by pressing the brake pads 14 and 15 against the disk rotor 13 on the rear side by using the power of the electric motor 25. However, the present invention is not limited to this structure, and the following mechanisms are examples of a rear braking mechanism for generating a braking force by using a power source other than a fluid pressure generated in the master cylinder 7:

(a) a fluid pressure caliper which uses as a power source a fluid pressure source such as the Vehicles Attitude Control pump of the Vehicles Attitude Control mechanism, another fluid pressure pump, or an accumulator containing an accumulated pressure, and into which a fluid pressure is supplied by opening of a pipe valve of the Vehicles Attitude Control mechanism when the pedal stroke sensor 37 detects that the brake pedal 6 is operated;

(b) an electronic parking brake caliper which is actuated by a fluid pressure from the master cylinder at the time of service braking, and is actuated by an electric motor at the time of parking braking, and basically uses the electric motor for the parking actuation as a power source, and is actuated by the electric motor when the pedal stroke sensor 37 detects that the brake pedal 6 is operated;

(c) a regenerative mechanism of the electric motor 62 for driving the wheel (rear wheel 3R), for use in, for example, a hybrid car shown in FIG. 5;

(d) an electric brake other than a brake using an electric motor such as an electromagnetic brake.

Figure 6:
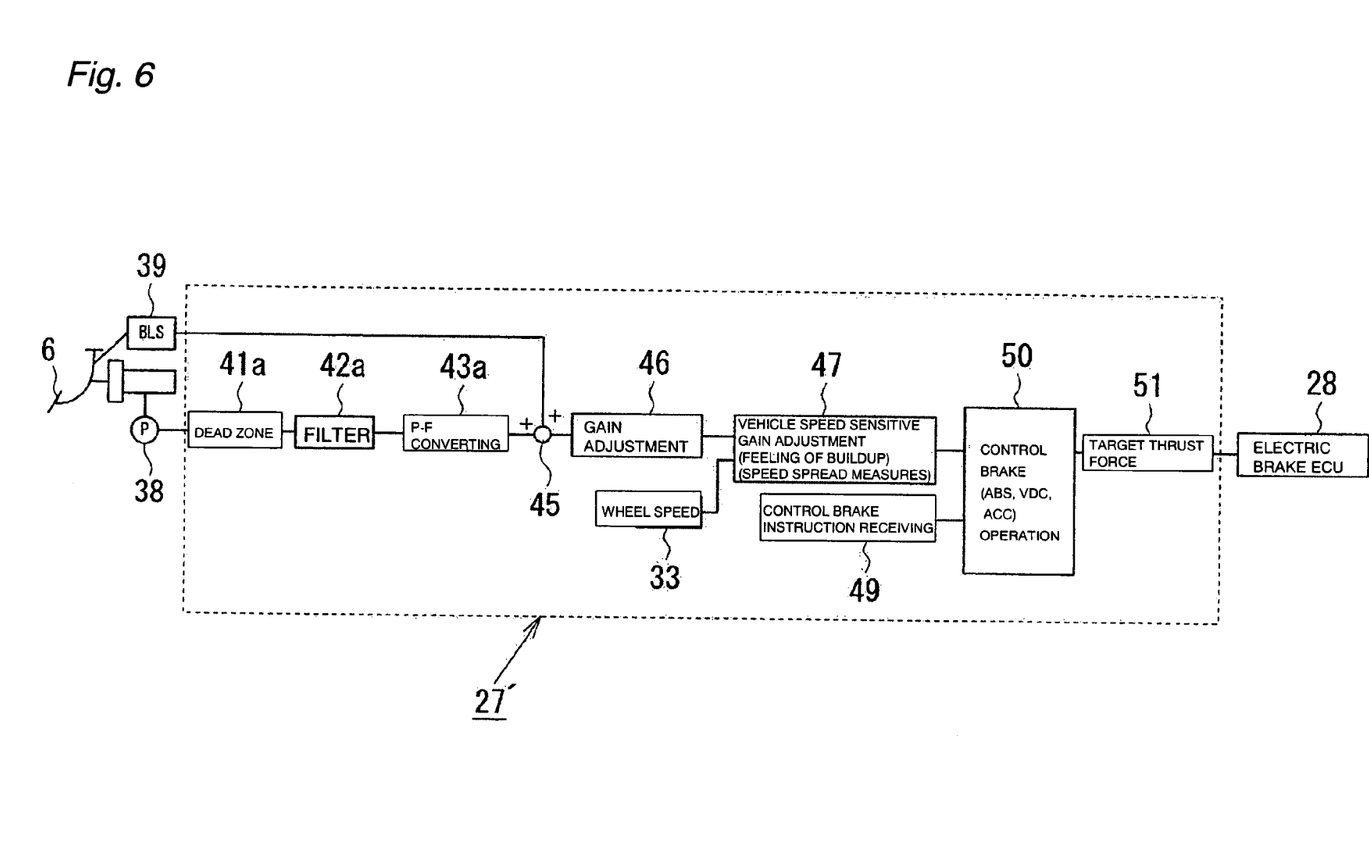
FIG. 6 is a control block diagram schematically illustrating a calculation and process performed by the main ECU in a variation.
Figure 7:
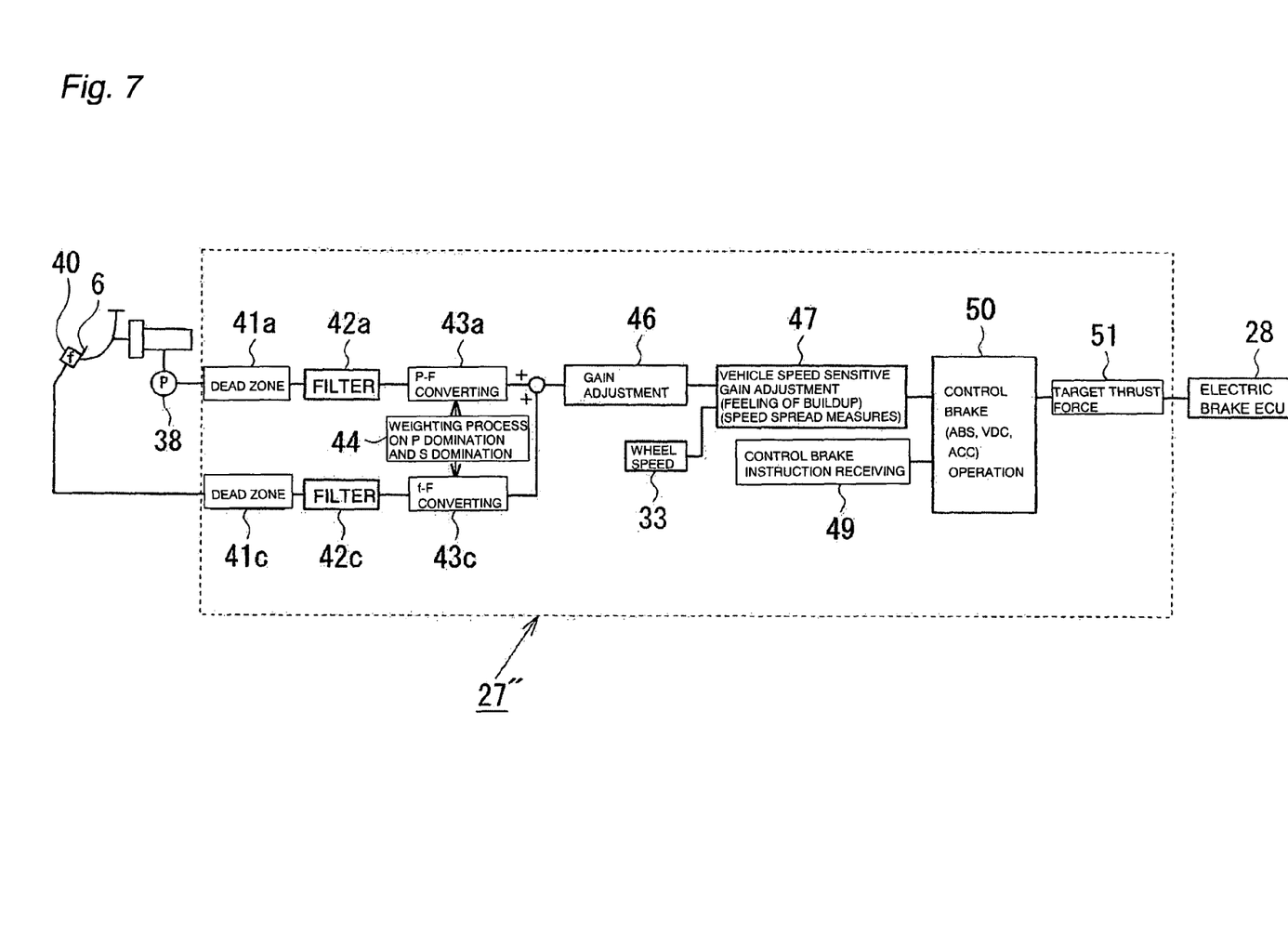
FIG. 7 is a control block diagram schematically illustrating a calculation and process performed by the main ECU in another variation.

In the present embodiment, an operation detector is embodied by the pedal stroke sensor 37. However, the present invention is not limited to this structure. An operation detector may be embodied instead by a combination of a brake lamp switch 39 and a fluid pressure sensor 38 as shown in FIG. 6, or a force sensor 40 operable to detect a pressing force (operation force) acting on the brake pedal 6 (braking operator) as shown in FIG. 7.

As a variation of the present embodiment, now description will be provided as to a brake device using as a detector the combination of the brake lamp switch 39 and the fluid pressure sensor 38. Referring to FIG. 6, when an operation of the brake pedal 6 is detected with the aid of the brake lamp switch 39, the electric brake 5 (rear braking mechanism) is actuated, and the electric brake 5 (rear braking mechanism) is caused to generate a braking force at a predetermined increasing rate, before the fluid pressure sensor 38 detects a predetermined pressure (of the master cylinder 7 sufficiently high for causing the fluid pressure brake 4 (front braking mechanism) to generate a braking force). After that, when the fluid pressure detected by the fluid pressure sensor 38 becomes the predetermined pressure (fluid pressure corresponding to pedal stroke h3 in FIG. 4), the electric brake 5 is controlled by a main ECU 27' so that the electric brake 5 generates a braking force according to the fluid pressure detected by the fluid pressure sensor 38. In this way, in the variation using as an operation detector the combination of the brake lamp switch 39 and the fluid pressure sensor 38, it is also possible to generate a braking force on the rear side prior to the front side, and smoothly increase a braking force to reduce rigid impression, whereby brake feeling can be improved.

As another variation of the present embodiment, now description will be provided as to a brake device using a force sensor 40 as an operation detector. Referring to FIG. 7, when a pressing force is detected by the force sensor 40 so that the operation of the brake pedal 6 is detected, the electric brake 5 (rear braking mechanism) is actuated, and is caused to generate a braking force at a predetermined increasing rate before the force sensor 40 detects that the force acting on the brake pedal 6 reaches a predetermined force sufficiently strong for causing the fluid pressure brake 4 (front braking mechanism) to generate a braking force. After that, the electric brake 5 is controlled by a main ECU 27" so that the electric brake 5 generates a braking force according to the pressing force detected by the force sensor 40. In this case, a pressing force f detected by the force sensor 40 is processed in the following manner. A detection signal of the force sensor 40 is compared to a predetermined dead zone by a pressing-force-value dead zone processing unit 41c. If the detection signal is included in the dead zone, the value is set to zero. If the detection signal is not included in the dead zoned, the value itself is input into the f-F converting unit 43c through the pressing-force-value filter unit 42c. The f-F converting unit 43c converts the input signal f into a signal indicating a braking force F (braking force signal). After that, the braking force F is processed in the same manner as in the above-described embodiment. In this way, in the braking device using the force sensor 40 as an operation detector, it is also possible to generate a braking force on the rear side prior to the front side, and smoothly increase a braking force to reduce rigid impression, whereby brake feeling can be improved.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-051307, filed on Feb. 29, 2008. The entire disclosure of Japanese Patent Applications No. 2008-051307 including specification, claims, drawings and summary is incorporated herein by reference in its entirety.

The Japanese Patent Application Public Disclosure No. H07-165054 is incorporated herein by reference in its entirety.

What is claimed is:

1. A brake device comprising:
   a front braking mechanism operable to perform a braking operation by pressing of a brake pad against a rotating disk rotor with use of a fluid pressure generated in a master cylinder in response to an operation of a braking operator; and
   a rear braking mechanism operable to perform a braking operation with use of another power source than the fluid pressure generated in the master cylinder in response to the operation of the braking operator,
   wherein the rear braking mechanism generates a braking force before the front braking mechanism generates a braking force with use of the fluid pressure generated in the master cylinder when the braking operator is operated.

2. The brake device according to claim 1, wherein each of the front braking mechanism and the rear braking mechanism is provided with a caliper for pressing the brake pad against the rotating disk rotor for generating the braking force.

3. The brake device according to claim 2, wherein a clearance between the disk rotor and the brake pad in the caliper of the front braking mechanism is set to be larger than a clearance between the disk rotor and the brake pad in the caliper of the rear braking mechanism.

4. The brake device according to claim 2, wherein the caliper of the rear braking mechanism is provided with an electric motor, and the caliper of the rear braking mechanism is actuated by the electric motor.

5. The brake device according to claim 2, wherein the rear braking mechanism is provided with a fluid pressure pump, and the caliper of the rear braking mechanism is actuated by the fluid pressure pump.

6. The brake device according to claim 1, wherein the rear braking mechanism comprises a regenerative mechanism of an electric motor actuating a wheel.

7. The brake device according to claim 1, wherein, after the braking force of the front braking mechanism reaches a predetermined value, the rear braking mechanism generates the braking force at an increasing rate less than an increasing rate before that, according to an operation of the braking operator.

8. A brake device comprising:
   a first braking mechanism operable to perform a braking operation by a caliper adapted to press a brake pad against a rotating disk rotor with use of a fluid pressure generated in a master cylinder in response to an operation of a brake pedal; and
   a second braking mechanism operable to perform a braking operation with use of another power source than the fluid pressure generated in the master cylinder in response to the operation of the brake pedal,
   wherein the second braking mechanism generates a braking force before the brake pad is pressed against the rotating disk rotor by the first braking mechanism with use of the fluid pressure in the master cylinder when the brake pedal is operated.

9. The brake device according to claim 8, further comprising an operation detector operable to detect an operation of the brake pedal, wherein the second braking mechanism starts to operate when the operation detector detects that the brake pedal is operated.

10. The brake device according to claim 8, wherein the second braking mechanism is provided with a caliper adapted to press a brake pad against a rotating disk rotor for generation of the braking force, and a clearance between the disk rotor and the brake pad in the caliper of the first braking mechanism is set to be larger than a clearance between the disk rotor and the brake pad in the caliper of the second braking mechanism.

11. The brake device according to claim 8, wherein, after the braking force of the first braking mechanism reaches a predetermined value, the second braking mechanism generates the braking force at an increasing rate less than an increasing rate before that, according to an operation of the brake pedal.

12. A brake device comprising
a front braking mechanism operable to perform a braking operation by pressing of a brake pad against a rotating disk rotor with use of a fluid pressure generated in a master cylinder in response to an operation of a braking operator;
a rear braking mechanism operable to perform a braking operation with use of another power source than the fluid pressure generated in the master cylinder in response to the operation of the braking operator; and
an operation detector operable to detect an operation of the braking operator,
wherein the rear braking mechanism starts to operate when the operation detector detects that the braking operator is operated, and generates a braking force before the operation detector detects that an operation value, for causing the front braking mechanism to generate a braking force with use of the fluid pressure generated in the master cylinder, is achieved.

13. The brake device according to claim 12, wherein each of the front braking mechanism and the rear braking mechanism is provided with a caliper adapted to press the brake pad against the rotating disk rotor for generation of the braking force.

14. The brake device according to claim 13, wherein a clearance between the disk rotor and the brake pad in the caliper of the front braking mechanism is set to be larger than a clearance between the disk rotor and the brake pad in the caliper of the rear braking mechanism.

15. The brake device according to claim 12, wherein the operation detector comprises a stroke sensor operable to detect a stroke of the braking operator.

16. The brake device according to claim 15, wherein the operation value is a predetermined stroke of the braking operator for causing the front braking mechanism to generate the braking force, and the rear braking mechanism generates the braking force before the stroke sensor detects that the stroke of the braking operator reaches the predetermined stroke.

17. The brake device according to claim 12, wherein the operation detector comprises a brake lamp switch operable to turns on/off a brake lamp in response to an operation of the braking operator, and a fluid pressure sensor operable to detect the fluid pressure in the master cylinder.

18. The brake device according to claim 17, wherein:
the rear braking mechanism starts to operate when the brake lamp switch is turned on;
the operation value is a predetermined pressure in the master cylinder for causing the front braking mechanism to generate the braking force; and
the rear braking mechanism generates the braking force before the fluid pressure sensor detects that the fluid pressure in the master cylinder reaches the predetermined pressure.

19. The brake device according to claim 12, wherein the operation detector comprises a force sensor operable to detect an operation force acting on the braking operator.

20. The brake device according to claim 19, wherein the operation value is a predetermined force acting on the braking operator for causing the front braking mechanism to generate the braking force, and the rear braking mechanism generates the braking force before the force sensor detects that the operation force acting on the braking operator reaches the predetermined force.

* * * * *